Aug. 6, 1935. V. W. MacISAAC 2,010,405
CENTRIFUGAL METHOD AND APPARATUS
Filed Jan. 29, 1931 2 Sheets-Sheet 2
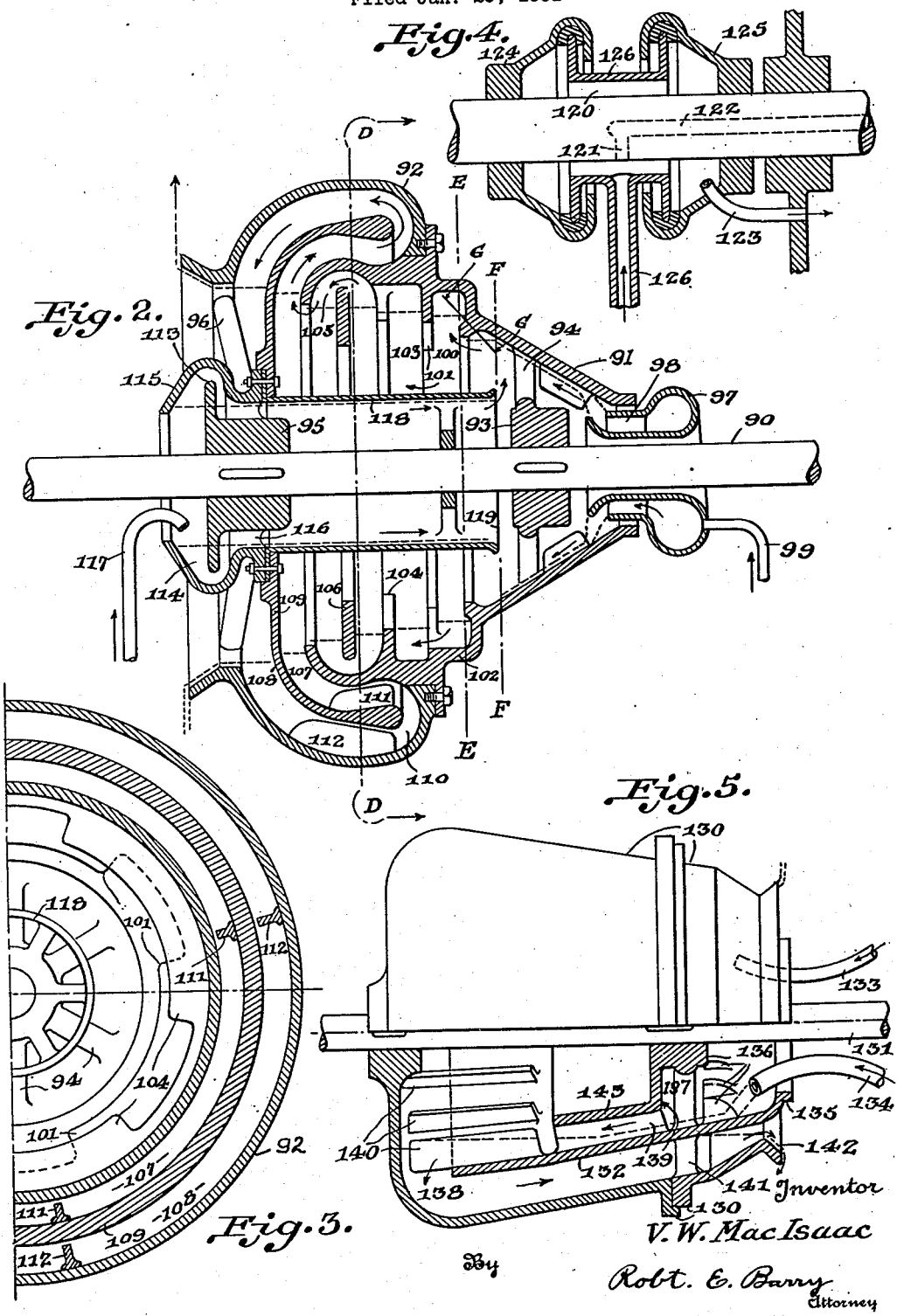
Inventor
V. W. MacIsaac
By Robt. E. Barry
Attorney Patented Aug. 6, 1935

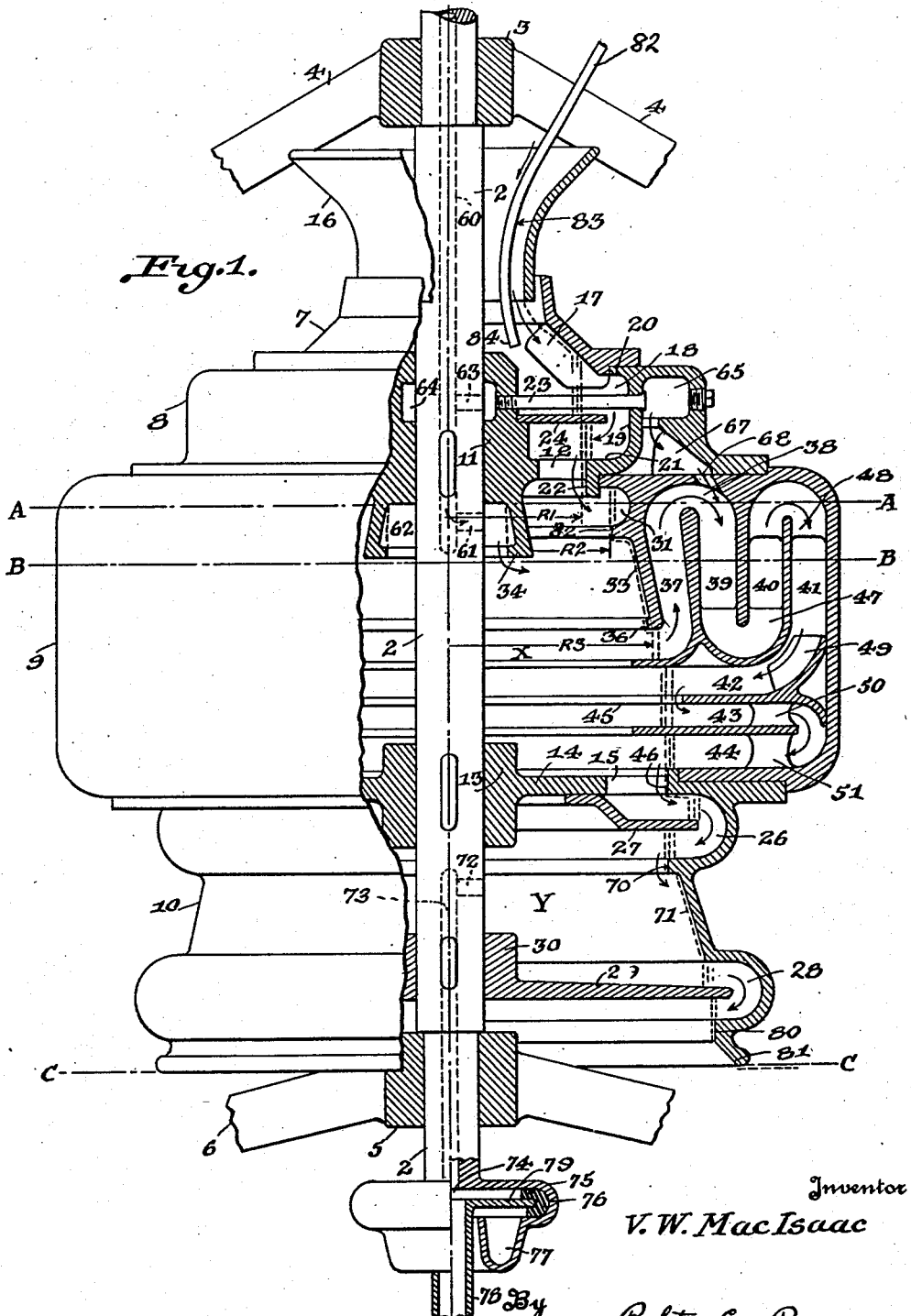

2,010,405

UNITED STATES PATENT OFFICE 2,010,405

CENTRIFUGAL METHOD AND APPARATUS

Vernon W. MacIsaac, Montreal, Quebec, Canada

Application January 29, 1931, Serial No. 512,123

27 Claims. (Cl. 259—3)

This invention relates in general to the continuous treatment of fluid masses by liquids and gases, and the intimate commingling of the treating liquids or gases with the mass being treated and the regulation of pressures during various stages of treatment for the most effective accomplishment of desired reactions and absorption of one ingredient by another.

The invention relates more especially to the application of chemical reagents, either liquor or gaseous or in the form of fluid mixtures of liquids and solids, to a continuously flowing stream of liquid or a fluid mixture of liquids and solids by the application of centrifugal force causing a rapid and thorough intermingling and impenetration of the ingredients and the isolation of the mixture from communication with the atmosphere and the production thereupon of gas pressures greater or less than atmospheric, and the application of heat.

The foregoing general statement of the nature of the invention is indicative of the wide range of use to which it may be applied. However, by way of an example, reference is made to one phase of use for the application of chlorine and ammonia, alkaline reagents such as caustic soda or calcium hydroxide to vegetable fibres in aqueous mixtures, for the application of dyes, the mixing of coloring pigments, the intermixing of solid and liquid reagents in hydrometallurgical and chemical industries and in general wherever the intimate and uniform mixing and absorption is desired of materials which may be caused to flow as liquid or fluid mixtures, whether for the purpose of aiding chemical combination or for whatever other purpose the invention may be adopted.

In the mixing and impregnating of fluid masses by chemical reagents without the use of centrifugal force the interminging of ingredients is ordinarily accomplished by the agitating effect of moving paddles and propellers in conjunction with stationary members of a containing vessel or by agitation of the container itself and, where pressures either above or below atmospheric, are desired as a part of the treatment, by treating the mixture in batches within a closed container.

In treatment according to the invention mixing is not caused by mechanical pushing and stirring of the mass as when relative motion of solid mixing elements is employed. Instead of the stirring action above referred to, the invention provides that the flow of the mixture due to centrifugal forces developed by the revolving mass within a rotating bowl is principally employed in a unique manner to produce the desired motion of the mass and thoroughly mix and combine its component parts as uniformly as may be, to induce varying pressures and velocities within the mass as the latter travels forward and to aid the forcible impregnation of the mass by the treating fluid. Pressures induced by centrifugal force developed by the revolving bowl and acting on liquid masses are used to provide a seal for the main body of fluid undergoing treatment to the complete exclusion of the atmosphere to permit varying gas pressures to be applied over and within it as, for instance, gas pressures of greater value than atmospheric pressure for the purpose of obtaining high concentrations of gas within the liquid portion of the mass or high temperatures to aid chemical reactions, or to permit the creation of partial vacuums for the purpose of removing excess gas and vapor and the like.

An example of the utility of the centrifugally maintained seal of a flowing mass against atmosphere is in the process of continuously bleaching fibrous vegetable pulps by the application of an aqueous solution of chlorine and chlorine compounds and chlorine gas. In this case it is desirable to accelerate the bleaching action by maintaining high concentrations of the chlorine in solution together with high temperatures in certain cases, and therefore in order to prevent rapid dispersal of the reagent gas from the solution it becomes advantageous to apply super-atmospheric pressure to the gas overlying the pulp mixture during the reaction and again before releasing it to atmosphere it is desirable to remove excess chlorine and water by subjecting it to sub-atmospheric pressure.

The foregoing specific examples of the treatment of material alone and in connection with the maintenance of a hermetic seal by the affect of centrifugal force in accordance with the invention are merely given for illustrative purposes. It will be readily recognized, however, that the invention is not confined to the specific examples of its use as referred to above or in the following description as it is widely applicable with extreme advantage in various arts or, in fact, wherever the treatment of masses capable of flowing in a stream under the affects of centrifugal force is involved.

"Fluid" and "flowable" as used in connection with the description of the invention are not to be regarded in a restricted sense as experiment along the lines of the possibility of application of the invention to various treatments will indicate that a large variety of materials which do not inherently embody the qualities necessary for treatment may be subjected to treatment. For instance, hydrated lime with air entrained in it becomes almost as fluid as water when under a slight head pressure and could form the main stream of "fluid" in carrying out the invention while the treating reagent could be chlorine gas with resultant formation of calcium hydrochlorite or bleaching powder.

Previous centrifugal means of impregnating a fluid mass with liquid reagents under atmospheric pressure have depended upon circulating the fluid mixture deviously through open channels within a cylindrical revolving bowl thus attaining a degree of mixing. The present invention employs positive means to perform the novel functions hereinafter more fully described for aiding the uniform commingling of the agents with the mass under treatment and their absorption thereby, and in particular is adapted for the centrifugal treatment of a continuously flowing stream of material.

The various functions and effects produced as well as the results attained with a treatment carried out in accordance with the invention are clearly evident from the foregoing taken in connection with the following detail description and the illustration of the invention in the accompanying drawings in which:

Fig. 1 is a side elevation, partly broken away and in section of a machine constructed in accordance with the invention.

Fig. 2 is a longitudinal section of a simpler form of the invention including fewer elements than those constituting the form shown in Fig. 1 and with the addition of certain features not disclosed in the latter figure and with variation of other features therein.

Fig. 3 is a half cross section of the machine shown in Fig. 2.

Fig. 4 is a modified form of liquid seal.

Fig. 5 is a half longitudinal section and half elevation of a further modification of the invention.

Fig. 1 illustrates the machine embodying most of the fundamental novel features of the invention but, as will be understood, it is not necessary for the successful treatment of material according to the invention to employ all of the structural features here illustrated in one machine and only such structural features may be embodied in a machine as may be required for successfully carrying out the desired treatment.

A main shaft 2 suitably driven by means, not shown, is supported for rotation in a top bearing 3 connected with the main stationary frame, not shown, by arms 4 and in a bottom bearing 5 also connected with the stationary frame by arms 6. A bowl constituted by parts 7, 8, 9 and 10 rigidly secured together is carried by the shaft 2, the support for the upper part of the bowl being constituted by a hub 11 rigidly keyed to the shaft and arms 12 integrally with the bowl part 8 and, at the lower part, by a hub 13, rim 14 and arms 15 integrally with the part 10.

All parts within the bowl revolve as a unit with it and are fixed therein without possibility of relative movement.

A fixed spout 16 attached to arms 4 is shown in a form suitable for operation with the machine in a vertical position, the supply material falling therethrough into the neck 7 of the revolving bowl where it is caught or engaged by vanes 17 and is thereby accelerated to the speed of the bowl and centrifugally thrown outwardly into an annular passage 18. However, the machine may be operated with its axis horizontal or in any intermediate inclined position with corresponding rearrangement of the inlet spout to effect proper delivery of liquid or flowable mass for treatment into the neck 7 under pressure as, for instance, in the form of invention illustrated in Fig. 2, as will be hereinafter more fully described.

In the process of intimately combining two or more ingredients forming a liquid of flowable mixture it is possible in many cases to add all or a portion of one to the other previous to feeding them into the revolving bowl for further treatment. This addition of the one to the other may be made in spout 16 or its equivalent with advantage to be derived from the mixing action enjoyed in the acceleration of the inflowing mixture by the vanes 17 and by friction against the interior surfaces of member 7 and of channel 18 and other surfaces over which it may flow.

Channel 18 is bounded on its outer circumference by surface 19 and is formed between inwardly turned sides 20 and 21. Centrifugal action in the revolving mass of inflowing liquid or semi-liquid mixture will throw it forcibly outward toward 19 so that at the beginning the channel 18 must first fill up to the level of the overflow rim 22 constituting a liquid ring with inner radius R—1. Thereafter new material flowing into the channel past vanes 17 will displace an equal amount of material from the channel 18 and cause it to flow around the circular pipe 23 and under the plate 24 over rim 22 in a thin stream to be abruptly turned outward (as it passes the edge of rim 22) in an outwardly flowing stream in a plane A—A.

Rim 22 may be rounded or sloped to moderate the intensity of the action without departing from the spirit of the invention, which is to gain the effect of outward cascading of a thin stream of the fluid by centrifugal action.

Part 23 is a circular conducting pipe for purposes described hereafter and occupies only a small part of the channel 18 and does not materially obstruct the passage of mixture therethrough in the direction indicated by arrows designating flow.

A circular plate 24 is attached to hub 11 and has an outer radius greater than R—1 so that its rim is immersed in the liquid contents of channel 18, thereby forming a seal against the passage of gas axially past it.

In centrifugal machines the centrifugal forces developed may in common practice attain values exceeding five hundred times gravity so that very large differences in gas pressures between the two sides of such a seal may be counterbalanced in centrifugal seals of small dimensions with small differences of liquid lever therein.

The seal as in the form of the invention illustrated comprises a continuous annular channel 18 and an inverted dam in the form of a disc-like plate 24, but it is obvious that the channel may be divided by partitions in axial planes into numerous independent passages or into one or more small passages leading outwardly from the axis and turning inwardly towards the axis may be used for the purpose without departing from the spirit of the invention which contemplates the production of a centrifugally maintained liquid filled gas seal to permit differential gas pressures on the two sides of the seal.

A similar liquid seal is used at the outlet of the main bowl section 9 as the channel 26 with inverted dam 27 attached to rim 14 and again at the outlet of section 10 as the channel 28 having sealing plate 29 extending from hub 30 keyed to the shaft.

Thus the interior of the bowl is divided into two main chambers X and Y against gas communication from each other and from the atmosphere but permitting free flow of the heavier fluid mass into and out of each chamber. It thus becomes possible to carry gas pressures in section X between dams 24 and 27 greater than atmospheric and partial vacuums in chamber Y between dams 27 and 29. The effectiveness of these seals in retaining these differences in gas pressure without blowing out depends upon their radial depth, the density of the fluid mixture flowing therethrough and the degree of centrifugal force produced by rotation. This explains in main part the isolation of the mixture from communication with the atmosphere.

Considering again the flow of fluid mass from rim 22, as it falls outward in plane A—A it is forcefully driven onto the surface of fluid mass in channel 31 (at radius R—2) and as the peripheral velocity of the fluid 31 is greater than that of the fluid cascading from rim 22 it is accelerated to the higher velocity by fluid friction, with consequent mixing action.

Again a similar effect is obtained as the liquid cascades over rim 32 onto the frusto-conical surface 33 where it is spread in a thin layer moving forward over the surface at high velocity.

In passing the plane B—B it may be forcibly impinged by treating fluid centrifugally thrown from the rim of drum 34 with effective mixing.

The flow of fluid mass continues outward over lip 36 to be discharged into passage 37 from which it is caused to flow through contracted orifice 38 where increase in velocity results, and in passing onward in passages 39, 40, 41, is more deeply submerged below its inner level at R—3 and is consequently subject to correspondingly increasing pressure of the internally superimposed layer of fluid and as it again moves radially inward through passage 42 it is subjected to a decreasing hydraulic pressure, to increasing pressure in passing outward through passage 43 under inverted dam 45, with decreasing pressure through 44 and over rim 46.

Vanes 47, 48, 49, 50 and 51 are suitably placed within the passages and serve to support the walls and to aid acceleration of the mixture to the peripheral speed of the bowl parts and to deflect and mix the ingredients and to divide and combine streams, to be further explained in description of Figures 2 and 3.

Again divisions in the annular passages 37, 39, 41, 44, etc. may be made to divide them into entirely separate sections providing a number of independent paths for different portions of the mixture and it is not intended to limit the form of the passages to those illustrated as many forms and combinations of submerged passages may be resorted to.

In centrifugal bowls rotating at high speed the fluid therein tends to form with its inner surface substantially in the form of a cylinder coaxial with the axis of rotation and having a radius from the centre of rotation equal to that of the discharge opening, which may be viewed as an overflow dam.

This cylindrical inner surface may be viewed (by analogy with liquid under the force of earth's gravity) as its liquid level or upper surface and as a liquid tends to seek its own level so in centrifugal machines the liquid tends to maintain the aforesaid cylindrical "level". Inasmuch as the radial centrifugal forces are ordinarily hundreds of times that of gravity the forces producing flow are correspondingly greater than that of natural gravity so that very small differences of head (measured radially) are sufficient to drive highly viscous and semifluid masses or mixtures against the frictional resistance of small passages and orifice, as 37, 38, 39, etc. in seeking the inner surface level.

The addition of treating fluid to the material being processed may be made, in many instances, previous to its entry to the rotating bowl, or it may be made within the bowl by being fed through the hollow shaft. Shaft 2 has a central hole 60 extending to its upper end, not shown, where it is connected with a supply pipe by means similar to that shown at the bottom end of the shaft for exhaust gases or other forms of fluid tight rotating joint may be used. Hole 60 has a radial outlet 61 leading liquid therefrom into chamber 62 where it is centrifugally thrown against the chamber wall and flows out over rim 34 to be centrifugally projected in plane B—B onto the main stream at 33.

An alternative path is provided from 60 through radial hole 63 leading the reagent into closed annular chamber 64 (hole 61 being closed in this case) thence through pipe 23 into chamber 65 formed with an inwardly opening channel to retain heavy impurities centrifugally subsided from the inflowing fluid, thence between divisions 67 through apertures 68 into the mass to be treated in passages 39 and at a region well submerged below its inner level R—3.

This path and method of application may be used to advantage as auxiliary to other methods or as substitute for other methods when a gaseous reagent or ingredient is to be applied either in gaseous form or in pressure concentrated liquid solution, or steam for heating and the like, in which case pressure is applied to the treating fluid, by any suitable means at the supply sufficient to cause it to enter the main stream of the liquid mass at 68 in passage 39. Escape of vapor is resisted through the liquid filled channel 37 and the mixture with its newly added reagent or ingredient remains submerged until it passes through passage 42. Thus higher concentration of gases in liquid and vapors may be applied and maintained within the submerged region of the mixture than at its inner surface R—3 corresponding to overgas pressure in the central body X.

Again by virtue of the seals at 24 and 27 isolating region X from atmospheric pressure the gas pressure in X may be carried higher than atmospheric thus aiding gas and vapor concentration and in many cases such concentration will be sufficient and gas or vapor or gas solutions under externally produced pressure may be added through the opening 61 instead of through 63. The gas pressure in X may be limited by the depth of immersion of dam 27 in sealing channel 26 so that depression of the liquid in channel 26 on the side of 27 adjacent to X may extend to the outer rim of 27 and excess gas will blow past 27 into region Y to be recovered for reuse or relieved therefrom as hereinafter described.

Again the treated material thoroughly mixed and impregnated and in certain cases heated or chemically changed in the main section 9 of the bowl passes through seal channel 26 into chamber Y and flows over rim 70 then outwardly in a thin layer over the frusto-conical surface 71. In cascading over 70 and flowing thinly over 71 it readily gives up its excess gas and vapor under the lowered pressure externally produced and maintained in Y which is continuously evacuated of accumulating gas through the radial hole 72 in the shaft and the central hole 73 leading downward to the end 74 of the shaft.

A stationary pipe 78 is connected at its far extremity, not shown, with suitable means of leading away gases therefrom and maintaining a partial vacuum therein. A circular shell 75 is attached to shaft 2 and is formed with an annular channel 76 to retain and rotate a body of liquid therein (mercury may be used). An annular cup 77 forms an extension thereto of size and shape adapted to retain the sealing liquid from 76 when rotation ceases whether the machine be operated with its axis vertical or horizontal. A circular flange 79 on fixed pipe 78 forms the inverted dam to complete the centrifugal gas seal. But other forms of fluid tight rotating joint may be used.

Finished mixture leaves chamber Y through seal channel 28 and passes over rim 80 and lip 81, being thrown therefrom along plane C—C into a suitable stationary annular receiver not shown.

Projecting into inlet 16 is supply pipe 82 connecting externally with a source of liquid ingredient intended to be mixed with the main mass which flows continuously through feed hopper 16 principally by the force of gravity. Pipe 82 may terminate in an open outlet high up in the hopper as at 83 in which case the ingredients would be combined previously to any rotative acceleration thereof by the revolving bowl parts, or it may terminate within the bowl as at 84 thus adding the liquid to the main mass after it has received some rotative impulse from the bowl parts (principally from vanes 17) but well before it has been completely accelerated to the speed of the bowl.

In Figure 2 shaft 90 is supported by suitable bearings not shown for rotation by any suitable means in a horizontal position, or in any other position, and carries the main bowl parts 91 and 92 through hub 93 keyed to the shaft with arms 94 and hub 95 with arms 96.

A suitable means of feeding liquid mass to the bowl when it is operating in a position other than vertical is shown by scoll chamber 97 with annular outlet spout 98 and connected to a source of supply having sufficient pressure to inject the material through spout 98 into the bowl.

Pipe 99 supplies a liquid ingredient under pressure to continuously combine with the main mass to form a mixture therewith before it is subjected to acceleration by the rotating bowl or it may be caused to project into the bowl, in a manner similar to pipe 82 in Figure 1.

The construction and action of the apparatus will be obvious in most part from a consideration of like parts of Figure 1. Attention is directed particularly to channel 100 having flange 101, which does not form a complete and uniform circle but which is cut down partially or completely to outer boundary 102 of the channel 100 at 3 equidistant parts of the circumference to form outflow passages into channel 103 which in turn has flange 104 similarly cut away to form outflow passage opposite the intervals between the passages in 101. By this arrangement of outflow spaces it is evident that the mixture flowing through any passage from channel 100 must divide into two streams which will travel circumferentially in channel 103 to unite with other similar streams from other passages in flowing through outlets in flange 104. Thus the outflowing stream is divided and recombined.

While only 3 outlet passages are shown from each channel 100 and 103 it is obvious that more or less may be used as desired and still fulfill the meaning of the invention which is to divide and combine streams of the onflowing mixture.

A novel method of delivering liquid ingredient from atmosphere through a gas seal into a chamber isolated from the atmosphere is illustrated in parts 113, 114, 115, etc. Hub 95 has an outwardly projecting flange 113 forming a solid inverted dam in channel 114 formed within the annular ring 115 which is joined rigidly to 113 and 95 by arms 116 forming passages therebetween for fluid to enter the bowl. Fluid is supplied from pipe 117 discharging into channel 114. A cylindrical tube 118 held by a flange between 115 and 109 (which are rigidly secured together by suitable fastenings) conducts treating liquid overflowing inwardly from channel 114 to its open end 119 at plane F—F where it is centrifugally thrown onto the mass moving over the bowl surface.

Again the inverted dam 108 extends solidly inward to member 115 to which it is attached with a fluid tight joint thus forming a closure toward the outflow end of the bowl and together with liquid seals formed by 114, 113, 107, 108, 109 isolates the interior from communication with the atmosphere. Obviously this construction may be used in other forms of bowl construction.

Figure 3 is a half section of the form of the invention shown in Figure 2 along plane D—D to disclose more clearly the nature of flanges 101 and 104 with passages therethrough and to show divisions 111 and 112 rigidly attached within the passages 107 and 108.

Figure 4 is an obvious modification of a fluid seal similar to that shown at the base of Figure 1 adapted to permit inflow or outflow of a fluid lighter than the sealing liquid and adapting the seal to be used at parts of the shaft other than its end. Communication of the chamber 120 with the interior of the bowl may be made either through the shaft itself as through passages 121, 122 or through a pipe 123 to any desired part of the bowl. Parts 124 and 125 rotate with the shaft and part 126 is held stationary and forms a conductor from a suitable fluid source.

Figure 5 is a further simplified form of the invention with bowl 130 mounted on shaft 131 and inner tubular member 132 mounted rigidly to rotate with the bowl and shaft. Stationary inlet conductors 133 and 134 connected to sources of supply project into member 132 beyond its inturned rim 135 to discharge onto, or close to, acceleration vanes 136. The mixture flows from between vanes 136 on between arms 137 thence toward the inner outlet of tubular member 132 at 138, travelling between vanes 139 and 140 which impart rotation effect to the fluid mixture to cause it to travel at the same speed as member 132. The outward course of the fluid is apparent within the bowl toward discharge rim 142 passing in its course between arms 141. Ring 143 and divisions 139 and member 132 combine to form tubular liquid passages through which the fluid is constrained to flow.

The foregoing description of the invention taken in connection with the illustration of practical embodiments of the invention in the accompanying drawings will suffice to afford those skilled in the art a full and complete knowledge of the invention. It will also be recognized that the elements constituting the construction herein disclosed may be in any sequence and arrangement and not necessarily confined to that herein disclosed, with the object of varying the effects desired. For instance, any number of ingredients may be added or treated and in any sequence desired, and at any desired part of the machine.

However, in the following there is enumerated the fundamental and important functions performed and the effects produced:

First, in the spreading of the fluid mass undergoing treatment in a relatively thin film over the interior of the bowl in a manner favorable to the uniform application thereto of treating reagent and rapid mixing, such function serving either of two purposes, namely, (a) to intimately mix a liquid reagent and (b) to absorb and mix a gaseous reagent. An instance of the spreading effect referred to which is highly favorable to the application of treating reagent and mixing is presented in the manner in which the liquid mass cascades over the rim 32 onto the frusto-conical surface 33 where it is spread in a thin layer moving over the surface at a high velocity.

Second, in the centrifugal spraying of liquid reagent whereby it is broken up into fine particles or a tenuous film and forcefully thrown outwardly onto the surface of the liquid mass with high penetrating effect and even distribution. Instances where this effect or function is produced and proceeded in accordance with the invention may be found in the forcible impingement by a treating fluid centrifugally thrown through the planes B—B from the rim of the drum 34 with effective mixing of the fluid mass moving in a thin layer along the surface 33. In Fig. 2 this function is performed by the treating fluid overflowing inwardly from the channel 114 to the open end 119 of the tube 118 from which the liquid is centrifugally thrown through the plane F—F onto the mass moving over the bowl surface at 91.

Third, in causing the mixture to cascade over an annular rim whereby its direction of flow relative to the bowl is abruptly changed from a substantially axial direction to an outward motion in a plane at right angles to the axis of rotation, or at an angle of less degree. This abrupt change of direction and the attending friction of the thin stream contributes to the intimate contacting of reagent with the substance being treated, particularly if it be a solid infibrous or granular form in a liquid mixture. Such effect is produced, for instance, in the embodiment of the invention disclosed in Fig. 1 in the passage of the liquid mass over the rim 22 and its abrupt outward turning over said rim in an outwardly flowing stream in a plane A—A. In the embodiment of the invention disclosed in Fig. 2 this function is performed in an obvious manner along the plane E—E, and it will be noted that a free falling outwardly directed cascade is not required for the purpose of the invention, but the outward cascade may be over a rounded or sloping rim carrying the liquid over a frusto-conical surface as along the plane G—G into the ring of mixture as in channel 100.

Fourth, in throwing the mass described in the foregoing paragraph as falling outwardly to a ring of the flowing mixture travelling at a higher circumferential velocity, whereby friction continuously acts to accelerate the newly inflowing liquid to the higher velocity of the ring mixture, with accompanying mixing and uniform intermingling of the ingredients. This effect is produced incident to the impingement of the mass overflowing the rim 22 on the ring of material in the channel 31, the latter material moving at a higher velocity than the material moving outwardly in the plane A—A from the rim 22. A similar action occurs in the operation of the form of invention illustrated in Fig. 2 when the material moving outwardly in the plane E—E impinges the ring of material in the outer part of the bowl.

Fifth, in the leading of the liquid mixture or mass outwardly and inwardly, that is, radially outward and under inverted dams or through submerged orifices and so to subject it to increasing hydraulic pressures, centrifugally produced in centrally superimposed layers of the liquid, as is caused to flow outward from the axis of rotation towards said orifices or apertures under inverted dams to decreasing hydraulic pressures as it is caused to flow inwardly toward the axis. An example of the increasing pressure to which the material is subjected is evident upon consideration of the path which the same takes through the passages 38, 39, 40 and 41, while the opposite effect is produced incident to the movement in the inward radial direction through the passage 42 resulting in a decreasing hydraulic pressure. Again, in passing outwardly through the passage 43 the pressure increases while in returning through the passage 44 and over the rim 46 a reduction in pressure occurs. In the form shown in Fig. 2 the varying pressure effect is produced by the material in passing the dam 106 and again in traversing the passages 107 and 108 defined by the dam 109.

Sixth, in the leading of the liquid mixture by centrifugal force to flow through submerged orifices in cross section less than the passages to and from said orifices whereby rapid change in velocity is imparted to the liquid with consequent turbulence and mixing action. The contracted orifice 38 connecting the passages 37 and 39 produces this effect by rapidly increasing the velocity, accompanied by the desired turbulence and mixing action. The restricted orifice 110 in the form of invention shown in Fig. 2 produces a similar effect in this form of the invention.

Seventh, in the directing of the mixture through conductors or passages submerged below the inner cylindrical boundary or level of the mixture, said passages directing the flow axially, radially, circumferentially or in any intermediate direction within the bowl so that the mixture is required to travel the length of such passage under the hydraulic head pressure centrifugally produced within the centrally superimposed layer of liquid mixture. The examples of the various arrangements for giving the desired direction to the moving mass of material consist in the various passages 37, 39, 41, 42, 44 and the like in the form of invention shown in Fig. 1 and the passages 107 and 108 and divisions 111 and 112 in the form of invention shown in Fig. 2 fulfilling the same purpose. The divisions 111, 112 may be positioned in a direction other than axial to divert the fluid circumferentially.

Eighth, in the diversion of flow within the submerged passages by deflectors to cause turbulence in the flowing and mixing of the ingredients. The vanes 47, 48, 49, 50 and 51 produce these effects in Fig. 1 and the divisions 111 and 112 fulfill the same purpose in the form shown in Fig. 2, particularly if positioned in a non-axial direction.

Ninth, in the division of the streams of the mixture issuing from the passages, either submerged or open, into smaller streams and their recombination with streams from other passages to aid uniform distribution of ingredients throughout the mass. This function is performed also by the vanes 47, 48, 49, 50 and 51 in Fig. 1 and by the divisions 111 and 112 in the form shown in Fig. 2. In this case the divisions 111 and 112 may be as shown or may completely divide the passages 107 and 108 and the orifices 110 into entirely separate passages or may be positioned in planes not parallel with the axis. This function is also performed particularly by deflectors 101 and 109.

Tenth, by the addition of all or part of the reagent to the fluid mass to be treated previous to engagement with rotating parts of the machine so as to gain the advantage of the mixing action arising from the acceleration of the inflowing mixture to high velocities within the machine by rotating parts of the latter or its addition early in the period of said acceleration to gain advantage of most of the mixing action and said acceleration by vanes. This result is attained by the introduction of two or more ingredients forming a liquid or flowable mixture into the revolving bowl through the spout 16 or its equivalent. Again, the supply pipe 82 arranged in the manner hereinabove described aids in producing this effect in connection with the embodiment shown in Fig. 1, whereas in Fig. 2 the pipe 99 supplies a liquid ingredient under pressure to continuously combine with the main mass to form a mixture therewith before it is subjected to the accelerating effect of the revolving bowl.

Eleventh, in the addition of all or part of the reagent either gaseous or liquid to the flowing stream of fluid to be treated at a region within the stream submerged beyond its inner cylindrical boundary and where it may be subject to the hydraulic pressure of the centrally superimposed layer of liquid mixture, thereby aiding penetration and permitting high concentrations of soluble gases and high temperatures. This effect is produced according to the invention by admission through the apertures 68 into the mass undergoing treatment in the region of the passage 39 which is well submerged below the inner level R—3.

Twelfth, in the addition of steam or fluid heat carrying medium to the flowing stream of fluid or liquid mixture being treated at a region within the main stream subject to hydraulic pressure or at the surface of the main stream, for the purpose of accelerating chemical reactions. The steam or like heated fluid medium may be admitted at 68 into the passage 39 or, as stated, at the inner surface of the mass.

Thirteenth, in the isolation of the mixture from atmospheric pressure and the subjection of said mixture to a gaseous pressure, externally produced, greater than atmospheric to retain high concentrations of dissolved gas or high liquid temperatures and prevent the escape of gas to the atmosphere. The division of the interior of the bowl into two chambers X and Y isolated from one another and from the atmosphere permits this function to be carried out with the aid of means located externally of the bowl and in communication with the respective chambers for variably controlling the pressure conditions therein. The isolation of the respective chambers from the atmosphere is, as stated in the foregoing, due to the provision of the seals at 24 and 27 and the limit of pressure to which these chambers may be subjected is governed by the effectiveness of the seals at these points. Sealing of the interior of the bowl in the form of the invention disclosed in Fig. 2 for permitting regulation of pressure and for isolating the exterior of the bowl from the atmosphere is provided by the parts 114, 113 and the dam 108.

Fourteenth, in the isolation of the mixture from communication with the atmosphere and subjecting it to an over-gas pressure externally produced and less than atmosphere to recover valuable gas reagent or hot vapors or to render the effluent less obnoxious. The isolation of the interior of the bowl from the atmosphere is stated in detail in the foregoing and again in the paragraph immediately preceding permits the reduction of pressure in the bowl for this purpose. The reduction in pressure in the chamber Y may, for instance, be produced and maintained by external means in communication with the chamber through the passage 72.

Fifteenth, in causing the fluid mass to cascade over a rim as stated in connection with the third function, but with the purpose and effect of relieving gas and vapor from the mixture into an overlying body of gas which may be at subatmospheric pressure or any other suitable pressure. Desired pressure condition for producing this effect may be set up and maintained by communication of the chamber Y with a suitable pressure regulating device communicating therewith through the opening 72, the cascading of the liquid mass aiding in relieving the mixture from gas and vapor.

Sixteenth, in the spreading of the fluid mass in a thin layer or film in a manner as set out in the first function above related, but for the purpose and effect of relieving gas therefrom as set out under the above fifteenth function.

Seventeenth, in the limitation of the pressure of the gas overlying the fluid mass within a closed chamber and the relief of excess gas therefrom by and through a liquid seal. The limitation of the pressure and the possibility of relief is afforded by the relative depth of immersion of the dam 27 in the sealing channel 26. According to the depth of immersion, excess gas at varying pressure will blow past 27, to be recovered for reuse or relieved therefrom as desired.

An important factor in carrying out treatment according to the invention consists in that it is continuous, as distinguished from machines which may be regarded as "batch mixers" requiring periodical replacement of a least one of the ingredients although treating liquids are frequently continuously added during the period of treatment of a batch for charge. It will be understood, however, that in the use of the term "continuous" the invention is not to be regarded as necessarily limited to the continuous supply of all ingredients to the exclusion of such cases where one ingredient may be introduced at intervals.

The foregoing enumeration of functions will be recognized as the fundamental effects produced by the machine, but it does not, of course, embrace a great number of secondary and reactionary effects which will become evident as the field of use of the machine is varied and extended. On the other hand, the order of occurrence of the functions is susceptible of variation and it is further possible that, for the purpose of obtaining a desired result, certain of the steps in the process of treatment may be entirely omitted.

What I claim is:

1. In a centrifugal machine for the continuous intermixing of flowing streams of fluid, a rotatable bowl having an inlet and an outlet, stationary fluid conductors for supplying fluid to the inlet, and fluid accelerating members within the bowl adapted to impinge the in-flowing fluid and accelerate it to the speed of said members, said members forming divisions with fluid passages therebetween to lead the fluid towards the inside of the bowl.

2. In a centrifugal machine for the continuous intermixing of flowing streams of fluid, a rotatable bowl having an inlet and an outlet, stationary fluid conductors for supplying fluid to the inlet, and fluid accelerating members within the bowl adapted to impinge the in-flowing fluid and accelerate it to the speed of said members, said members forming divisions with fluid passages therebetween to lead the fluid toward the inside of the bowl and toward the outlet.

3. In a centrifugal machine for the continuous intermixing of flowing streams of fluid, a rotatable bowl having an inlet and an outlet, stationary fluid conductors for supplying fluid to the inlet, and fluid accelerating members within the bowl adapted to impinge the in-flowing fluid and accelerate it to the speed of said members, said members forming divisions with fluid passages therebetween to lead the fluid toward the inside of the bowl, said inlet and outlet being concentric with the axis of rotation of the bowl and the inlet being of less diameter than the outlet.

4. In a centrifugal machine for the continuous intermixing of flowing streams of fluid, a rotatable bowl having an inlet and an outlet, stationary fluid conductors for supplying fluid to the inlet, and fluid accelerating members within the bowl adapted to impinge the in-flowing fluid and accelerate it to the speed of said members, said members forming divisions with fluid passages therebetween to lead the fluid toward the inside of the bowl, said bowl having a portion of its internal surface thereof disposed in approximately parallel relation to the axis of rotation of the bowl to produce a spreading of the flowing fluid in a thin stream over the surface under the influence of centrifugal force.

5. In a centrifugal machine for the continuous intermixing of at least two flowing streams of fluids, a rotatable bowl having an inlet and an outlet, fluid supply means for admitting a main stream of fluid through said inlet to the bowl, a second inlet to admit a secondary stream of fluid to the bowl to be centrifugally thrown into the flowing stream of main fluid, and means intermediate the second inlet and the bowl to accelerate the movement of the secondary fluid.

6. In a centrifugal machine for the continuous intermixing of at least two flowing streams of fluids, a rotatable bowl having an inlet and an outlet, fluid supply means for admitting a main stream of fluid through said inlet to the bowl, a second inlet to admit a secondary stream of fluid to the bowl to be centrifugally thrown into the flowing stream of main fluid, and means intermediate the second inlet and the bowl to accelerate and spray the secondary fluid.

7. In a centrifugal machine for the continuous intermixing of at least two flowing streams of fluid, a rotatable bowl having an inlet and an outlet, fluid supply means for admitting a main stream of fluid through said inlet to the bowl, a spray chamber located centrally in the bowl and spaced therefrom, a second inlet to admit a secondary stream of fluid to the spray chamber, said spray chamber constituting means for accelerating the movement of the secondary in-flowing fluid and for causing the secondary fluid to be thrown against the interior of the bowl and into the flowing stream of the main fluid moving toward said outlet.

8. In a centrifugal machine for the continuous intermixing of at least two flowing streams of fluid, a rotatable bowl having an inlet and an outlet, fluid supply means for admitting a main stream of fluid through said inlet to the bowl, a spray chamber located centrally in the bowl and spaced therefrom, a second inlet to admit a secondary stream of fluid to the spray chamber, said spray chamber constituting means for accelerating the movement of the secondary in-flowing fluid and for causing the secondary fluid to be thrown against the interior of the bowl and into the flowing stream of the main fluid moving toward said outlet, a portion of the interior of the bowl lying intermediate the inlet and outlet thereof being disposed to permit the main fluid to flow in a thin stream thereover in the vicinity of the point of meeting of the main and secondary fluids.

9. In a centrifugal machine for the continuous intermixing of flowing streams of fluids, a rotatable bowl having an inlet and an outlet, said bowl having a channel to contain an annular body of centrifuged fluid therein, and a cascade rim inwardly disposed with respect to said channel and disposed in the path of fluid whereby the latter is caused to be charged in a thin stream into the annular body of fluid.

10. In a centrifugal machine for the continuous intermixing of flowing streams of fluids, a rotatable bowl having an inlet and an outlet, said bowl having a channel to contain an annular body of centrifuged fluid therein, and a cascade rim inwardly disposed with respect to said channel having an abruptly out-turned edge and disposed in the path of fluid whereby the latter is caused to be charged in a thin stream into the annular body of fluid.

11. In a centrifugal machine for the continuous intermixing of flowing streams of fluids, a rotatable bowl having an inlet and a single outlet, a wall located in the bowl presenting an annular channel therein adapted to retain a layer of fluid under the influence of centrifugal force, and divisions positioned within the channel to divert the stream of fluid in a circuituous path outwardly from the axis of rotation of the bowl during its passage from the inlet to the outlet.

12. In a centrifugal machine for the continuous intermixing of flowing streams of fluids, a rotatable bowl having an inlet and an outlet, a wall located in the bowl presenting an annular channel therein adapted to retain a layer of fluid under the influence of centrifugal force, means for supplying fluids to be mixed to said bowl and divisions positioned within the channel to divert the stream of mixed fluids in a devious path during its passage from the inlet to the outlet, said divisions being arranged to divert the fluid passing from the inlet to the outlet outwardly from and inwardly toward the axis of rotation of the bowl.

13. In a centrifugal machine for the continuous intermixing of flowing streams of fluids, a rotatable bowl having an inlet and an outlet, a wall located in the bowl presenting an annular channel therein adapted to retain a layer of fluid under the influence of centrifugal force, means for supplying fluids to be mixed to said bowl and divisions positioned within the channel to divert the stream of mixed fluids in a devious path during its passage from the inlet to the outlet, said divisions being adapted to cause the fluid to flow in submerged streams and defining portions of restricted cross sectional area, and fluid impinging and accelerating members in said bowl.

14. In a centrifugal machine for the continuous intermixing of flowing streams of fluid, a rotatable bowl having an inlet and an outlet, stationary fluid conductors for supplying fluid to the inlet, and fluid accelerating members within the bowl adapted to impinge the in-flowing fluid and accelerate it to the speed of said members, said members forming divisions with fluid passages therebetween to lead the fluid toward the inside of the bowl, said bowl having a portion of its internal surface thereof disposed in approximately parallel relation to the axis of rotation of the bowl to produce a spreading of the flowing fluid in a thin stream over the surface under the influence of centrifugal force, a cascade member located in the bowl in the path of the flowing stream of fluid passing from the inlet to the outlet and having an edge adapted to abruptly change the direction of flow of the fluid outwardly under the influence of centrifugal force.

15. In a centrifugal machine for the continuous treatment of a flowing stream of fluid, a rotatable bowl, a plurality of seals located in the bowl and dividing the latter into a plurality of chambers permitting the free flow of the fluid undergoing treatment from one chamber to the other but isolating each chamber from the others with respect to the passage of fluids other than that undergoing treatment, and separate conduits communicating with the respective chambers conducting fluids under differential pressure.

16. In a centrifugal machine for the treatment of a flowing stream of continuously moving fluid, a rotatable bowl having an inlet and an outlet, means for containing a liquid for sealing the internal chamber of the bowl against passage of fluid other than that to be treated, and a pressure reduction conduit in communication with the central portion of the chamber for reducing the pressure in said chamber.

17. In a centrifugal machine for the treatment of a flowing stream of continuously moving fluid, a rotatable bowl having an inlet and an outlet, means for containing a liquid for sealing the internal chamber of the bowl against passage of fluid other than that to be treated, and a pressure reduction conduit in communication with the central portion of the chamber adapted for connection with external pressure reducing means for reducing the pressure in said chamber, and means for producing a cascade of the fluid flowing through the bowl during the treatment.

18. In a centrifugal machine for the treatment of a flowing stream of continuously moving fluid, a rotatable bowl having an inlet and an outlet, means for containing a liquid for sealing the internal chamber of the bowl against passage of fluid other than that to be treated, and a pressure reduction conduit in communication with the central portion of the chamber adapted for connection with external pressure reducing means for reducing the pressure in said chamber, said bowl having an internal surface disposed to cause the fluid to flow thereover in a thin layer.

19. A method of intermixing and impregnating fluids in a revolving bowl, consisting in inducing continuous flow of certain of the fluids through the bowl by centrifugal force and spreading a portion of the fluid in a thin layer over the interior of the bowl and centrifugally spraying another of the fluids on the continuously flowing fluid.

20. A method of intermixing and impregnating fluids in a revolving bowl, consisting in centrifugally inducing continuous flow of one of the fluids through the bowl and centrifugally spraying another of said fluids on the continuously moving fluid to effect intermixing thereof.

21. A method of intermixing and impregnating fluids in a revolving bowl, consisting in centrifugally inducing continuous flow of the fluid through the bowl, closing communication between the atmosphere and the fluid flowing through the bowl, and subjecting the fluid passing through the bowl to the pressure effect of a second fluid.

22. A method of treating fluids in a revolving bowl, consisting in continuously maintaining a fluid flowing through the bowl, applying a fluid under pressure to a portion of the stream of fluid flowing through the bowl, and creating a sub-atmospheric pressure in another part of the stream of fluid flowing through said bowl.

23. A method of treating fluids in a revolving bowl, consisting in centrifugally maintaining continuous flow of a fluid through the bowl, subjecting a part of the stream of fluid flowing through said bowl to superatmospheric pressure, and maintaining a sub-atmospheric pressure above the surface of another part of the fluid passing through said bowl to effect withdrawal of the fluid lying above the surface of the continuously flowing fluid stream.

24. A method of treating fluid in a revolving bowl, consisting in centrifugally inducing continuous flow of a fluid through the bowl, cascading the flowing fluid streaming through the bowl, subjecting a portion of the fluid flowing through the bowl to the pressure of a second fluid.

25. A method of treating fluid in a revolving bowl, consisting in centrifugally inducing continuous flow of a fluid through the bowl, cascading the flowing fluid streaming through the bowl, subjecting a portion of the fluid flowing through the bowl to the pressure of a second fluid and creating a sub-atmospheric pressure over another portion of the continuously flowing stream.

26. A method of treating fluids in a revolving bowl, consisting in centrifugally inducing continuous flow of a fluid through the bowl and causing the fluid to flow, in part, in a thin film, subjecting a portion of the flowing stream of fluid to the pressure of a second fluid, and maintaining a sub-atmospheric pressure overlying another portion of the flowing stream of fluid.

27. A method of treating fluids in a revolving bowl, consisting in centrifugally inducing continuous flow of a fluid through the bowl and causing the fluid to flow, in part, in a thin film, and for cascading the stream of fluid flowing through the bowl, subjecting a portion of the flowing stream of fluid to the pressure of a second fluid, and maintaining a sub-atmospheric pressure overlying another portion of the flowing stream of fluid.

VERNON W. MacISAAC.